United States Patent [19]

Marcus

[11] 4,290,678
[45] Sep. 22, 1981

[54] PIEZOELECTRIC FLASH-READY INDICATOR FOR PHOTOGRAPHIC CAMERA

[75] Inventor: Michael A. Marcus, Rochester, N.Y.

[73] Assignee: Eastman Kodak Company, Rochester, N.Y.

[21] Appl. No.: 182,896

[22] Filed: Sep. 2, 1980

[51] Int. Cl.³ .................. G03B 15/02; G03B 17/20
[52] U.S. Cl. .................................... 354/128; 354/53
[58] Field of Search .............. 354/127, 128, 53, 135; 362/5; 315/241 P

[56] References Cited

U.S. PATENT DOCUMENTS

| | | | |
|---|---|---|---|
| 2,856,562 | 10/1958 | Grimm | 315/135 |
| 2,894,174 | 7/1959 | Schankler | 315/230 |
| 3,120,791 | 2/1964 | Bundschuh et al. | 354/128 |
| 3,374,718 | 3/1968 | Hochretter | 354/53 X |
| 3,416,422 | 12/1968 | Dietrich et al. | 354/128 |
| 3,500,451 | 3/1970 | Yando | 354/135 X |
| 3,668,985 | 6/1972 | Wazumi | 354/53 X |
| 3,727,527 | 4/1973 | Borowski et al. | 95/10 R |
| 3,831,079 | 8/1974 | Iwata | 321/2 |
| 3,912,830 | 10/1975 | Murayama et al. | 427/100 |
| 3,971,250 | 7/1976 | Taylor | 73/88.5 |

FOREIGN PATENT DOCUMENTS 2004261 8/1971 Fed. Rep. of Germany ........ 354/53

OTHER PUBLICATIONS

The Article by C. P. Germano entitled "Flexure Mode Piezoelectric Transducers", IEEE Transactions on Audio and Electroacoustics, vol. AU-19, No. 1, Mar. 1971.

Primary Examiner—Donald A. Griffin
Attorney, Agent, or Firm—Thomas H. Close

[57] ABSTRACT

A piezoelectric flexure device, mounted on a photographic camera, is used to indicate the "state of readiness" of the camera's electronic flash unit. The flexure device is operatively connected with the flash unit's storage capacitor so that the flexure device is subjected to an electric field proportional to the level of charge on the storage capacitor. Since the shape of a flexure device depends upon the electric field across it, its appearance provides a visual indication to the camera user of the level of charge on the flash capacitor and, hence, the "readiness" of the energizing circuit. Preferably, the flexure device is made of a piezoelectric plastic film, such as PVF₂, which exhibits substantial deformation in the presence of an electric field which can be readily produced by the DC power supply in conventional flash units.

12 Claims, 4 Drawing Figures

PIEZOELECTRIC FLASH-READY INDICATOR FOR PHOTOGRAPHIC CAMERA

BACKGROUND OF THE INVENTION

This invention relates to improvements in photographic cameras of the type which are adapted to accommodate an integral or accessory-type electronic flash unit. More particularly, this invention relates to improvements in "flash-ready" indicators.

Nearly all cameras embodying electronic flash units, whether built-in or added as an accessory, incorporate a visual indicator, such as a neon lamp, meter movement, liquid-crystal display, etc., to alert the camera user when the charge-storage capacitor of the flash-energizing circuit has been charged to a level sufficient to ignite the flashlamp. See, for example, the disclosures of U.S. Pat. Nos. 3,831,079; 3,727,527; 2,894,179 and 2,856,562. Generally speaking, the "flash-ready" indicators disclosed for use in photographic cameras are disadvantageous from the standpoints of manufacturing costs, ruggedness and/or reliability.

SUMMARY OF THE INVENTION

The primary object of this invention is to provide a highly reliable flash-ready indicator which is both rugged in construction and inexpensive to fabricate.

The flash-ready indicator of the invention comprises a piezoelectric flexure device (e.g. a bimorph or unimorph piezoelectric bender) which is operatively coupled to the charge storing element of the camera's flash energizing circuitry. As the charge storing element gradually accumulates charge from its DC power supply between successive flash energizations, the electric field across the piezoelectric flexure device gradually increases, thereby causing the device to undergo a change in shape. Since the instantaneous shape of the piezoelectric device is indicative of the instantaneous charge on the charge storing element, the physical appearance of the piezoelectric device is indicative of the state of readiness of the flash energizing circuit.

According to a preferred embodiment, the piezoelectric flash-ready indicator of the invention is mounted within the viewfinder portion of a camera housing so as to be observable by the photographer while framing the picture to be photographed. Preferably, the indicator comprises a bimorph bender made from thin films of a piezoelectrically-active plastic material which exhibits substantial deformation in the presence of an electric field having a field strength which can be readily produced by the voltage stored by the capacitive element of conventional electronic flash units. A particularly preferred piezoelectric plastic is polyvinylidene fluoride ($PVF_2$).

According to an alternative embodiment, a piezoelectric flexure element is used as a "motor" to control the position of a "message blocking" member which is viewable in the camera's viewfinder, whereby the state of readiness of the flash-energizing circuit is communicated to the camera user.

The invention and its various objects and advantages will become better understood from the ensuing detailed description of preferred embodiments, reference being made to the accompanying drawings.

DETAILED DESCRIPTION OF PREFERRED EMBODIMENTS

Figure 1:
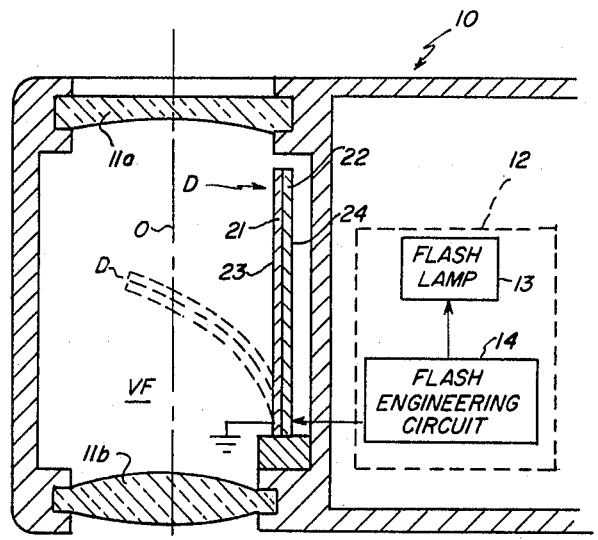
FIG. 1 illustrates a portion of a photographic camera in which the piezoelectric flash-ready indicator of the invention is incorporated.

Before discussing the preferred embodiments of this invention in detail, some definitions and background on piezoelectric flexure devices is appropriate.

A "piezoelectric flexure device," also known as a "piezoelectric bender," is a device which, owing to its piezoelectric properties, either bends in the presence of an applied electric field, or alternatively, generates a voltage in response to being mechanically bent or stressed. In its simplest form, such a device is a bilaminar structure comprising a pair of bonded strips, at least one of such strips exhibiting piezoelectric properties. In the presence of a relatively strong DC electric field, the piezoelectric strip expands (or contracts, depending on its poling direction relative to the direction of the applied field) and, because the strip to which it is bonded resists such expansion or contraction, the device flexes or bends.

A piezoelectric flexure device in which only one of the two bonded strips has piezoelectric properties is known as a "unimorph". However, the more common form of piezoelectric flexure device comprises a pair of bonded strips which are uniaxially polarized in opposite directions. Such a device is known as a "bimorph." When an electric field is applied across the thickness dimension of the bilaminar structure, such field being aligned with the poling direction of one of the strips and opposed to the poling direction of the other, one strip becomes longer while the other becomes shorter. The net result is that the structure bends, the action being somewhat akin to that of a heated bimetal strip. To facilitate the application of an electric field across the thickness dimension of the bilaminar structure, each of the bonded strips is provided with a conductive coating on its outside surface, such coating serving as an electrode to which a reference voltage can be connected. For a better description of the structural details of unimorphs and bimorphs, the manner in which they are poled, and their various uses, one may refer to an article by C. P. Germano, entitled "Flexure Mode Piezoelectric Transducers," IEEE Transactions on Audio and Electroacoustics, Vol. AU-19, No. 1, March 1971.

In recent years a number of high polymer films have been found to exhibit a significant piezoelectric effect upon being suitably poled. Most interesting of these plastic films is polyvinylidene fluoride, commonly known as $PVF_2$. The use of $PVF_2$ as a piezoelectric transducer is thoroughly documented in the technical and patent literature; see, for instance, U.S. Pat. No. 3,912,830 issued to Murayama et al, and U.S. Pat. No. 3,971,250 issued to Taylor. Of all known piezoelectric materials, $PVF_2$ has been found to exhibit the greatest "deflection-bandwidth product," a figure of merit which takes into account the most important parameters of a piezoelectric flexure device; namely, its ability to change dimensions in the presence of an electric field, and its frequency response. The deflection-bandwidth product of a material is determined by its Young's modulus density and piezoelectric charge coefficient, and the maximum electric field which the material can withstand without becoming depoled. For $PVF_2$, the deflection-bandwidth product is approximately 3 times that of ceramic piezoelectric materials, such as lead zirconate titanate (PZT).

To achieve the maximum deflection at the free end of a cantilever-mounted $PVF_2$ bimorph, an electric field of approximately 1 megavolt per inch of thickness must be applied across the piezoelectric strips. Thus, to achieve maximum displacement from a $PVF_2$ bimorph having a thickness of 0.0003 inch, a potential of approximately 300 volts must be applied between the bimorph's electrodes. It has been observed that when such a voltage is applied to a cantilever-mounted $PVF_2$ bimorph, the free end will be deflected to a position which is approximately 90° with respect to its original position. Less dramatic, though readily detectable and useful deflections are produced by applying a similar field to a $PVF_2$ bimorph which is ten times as thick, i.e. 0.003 inch. Conversely, substantial deflections can be produced in a 0.0003 inch $PVF_2$ bimorph by connecting a voltage source of only 100 volts DC between the bimorph's electrodes.

In addition to $PVF_2$, thin films of other high polymer plastics, such as polyvinylfluoride (PVF), polyvinylchloride (PVC) and copolymers of $PVF_2$ and polytetrafluoroethylene, exhibit substantial piezoelectric activity and are useful in the manufacture of piezoelectric benders of the type which are useful in the present invention.

Referring now to the drawings with the foregoing discussion in mind, a preferred form of the piezoelectric flash-ready indicator of the invention is shown in FIG. 1. There, a piezoelectric flexure device D is mounted in a cantilever fashion within the viewfinder VF of a photographic camera 10. Viewfinder VF comprises a pair of spaced lenses 11a, 11b, which share a common optical axis 0, and the flexure device D, when unaffected by an electric field, extends in a direction substantially parallel to the optical axis 0. To prevent the flexure device from interfering with viewfinding when it flexes to its position shown in phantom lines, it is vertically displaced from axis 0, just above or below the field of view of the viewfinder.

Figure 3:
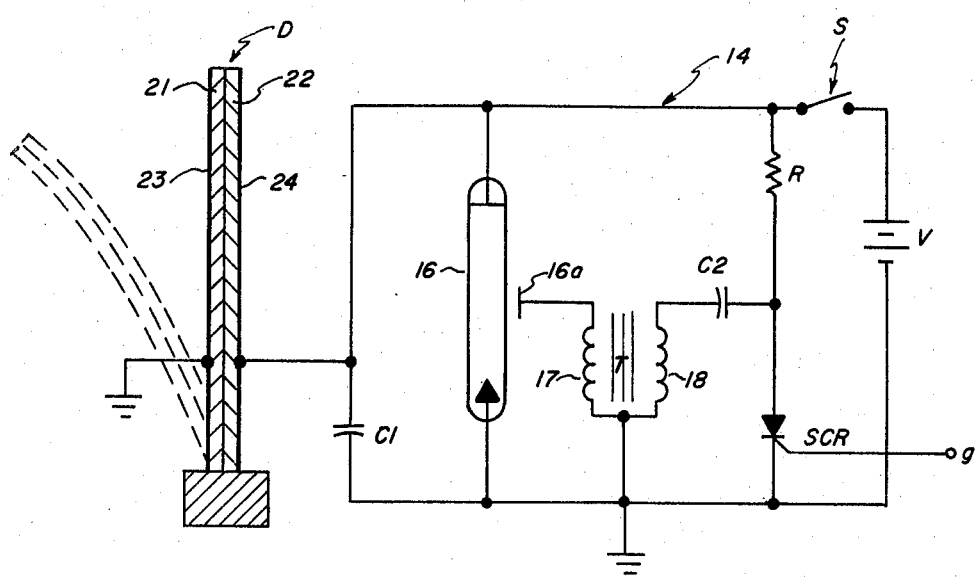
FIG. 3 is an electrical schematic of a flashlamp energizing circuit showing the manner in which the flash-ready indicator of the invention may be operatively coupled thereto.

Camera 10 is of the type which comprises, as an integral part thereof, an electronic flash unit 12. Inasmuch as electronic flash units are well known, it suffices to say that flash unit 12 comprises a flashlamp 13 which is selectively energizable by a flash energizing circuit 14, such as shown in FIG. 3. Conventional flash energizing circuits typically include a charge storage element (shown as capacitor C1 in the flash energizing circuit of FIG. 3) which must be charged to between 200 and 300 volts before the circuit is "ready" to energize the flashlamp.

The piezoelectric flexure device D is preferably of the aformentioned "bimorph" variety, comprising a pair of piezoelectric strips 21 and 22 which are bonded together to form a bilaminar structure. Each of the piezoelectric strips is uniaxially polarized and, as bonded together, the directions of polarization are opposed. The outer surfaces of the piezoelectric strips are provided with metallic coatings 23 and 24 which serve as electrodes by which an electric field can be applied across the thickness dimension of the bilaminar structure. As shown in FIG. 3, the bimorph's electrodes are connected across the charge storage element of circuit 14 and, as charge is accumulated by this element, the piezoelectric layers of the bimorph are subjected to a gradually increasing electric field. Preferably, each of the piezoelectric strips of the bimorph comprises a thin film (e.g. between 0.3 and 3.0 $\times$ $10^{31\ 3}$ inch) of polyvinylidene fluoride which has been suitably poled to render it piezoelectrically active. When a voltage of 300 volts is applied between the electrodes of such a $PVF_2$ bimorph, the bimorph will flex to a shape similar to that shown in phantom lines in FIG. 1. Such a change in shape is clearly visible to the camera user as he views the scene through the camera's viewfinder. Since the shape of the bimorph is indicative of the level of charge on the charge storage element on the flash energizing circuit, a visual indication of the state of readiness of the flash unit is provided.

The manner in which the piezoelectric flash-ready indicator of the invention is operatively coupled to the flash energizing circuit 14 of flash unit 12 is shown schematically in FIG. 3. Circuit 14 comprises a flash storage capacitor C1 which is connected across the terminals of a relatively high voltage (e.g. 300 volts) DC power supply V, and a high voltage transformer T. The electrodes of flashlamp 16 are connected across the power supply and its trigger electrode 16a is connected to the secondary winding 17 of the transformer. A resistor R and a normally open triggering switch, shown as an SCR, are connected in series across the power supply. The primary winding 18 of transformer T is connected in series with a trigger capacitor C2 at the junction between resistor R and the SCR. When the flashlamp 16 is to be fired, a normally open switch S is closed, thereby charging the flashlamp capacitor C1 and the trigger capacitor C2 to approximately 300 volts DC. As the field across capacitor C1 increases, the field across the flexure device increases, thereby causing it to bend to the position shown in phantom lines. As the camera shutter is activated, a trigger signal is applied to the gate g of the normally open SCR, thereby causing the SCR to conduct and dumping the charge on the trigger capacitor C2 across the primary winding 18. This causes the potential on the trigger electrode 16a of the flashlamp to rise to several thousand volts, thereby causing the flashlamp to ignite. After the flashlamp ignites, the charge on capacitor C1 is discharged and the field across the bimorph removed, this allows the bimorph to return to its rest position, as shown in solid lines.

Figure 2A:
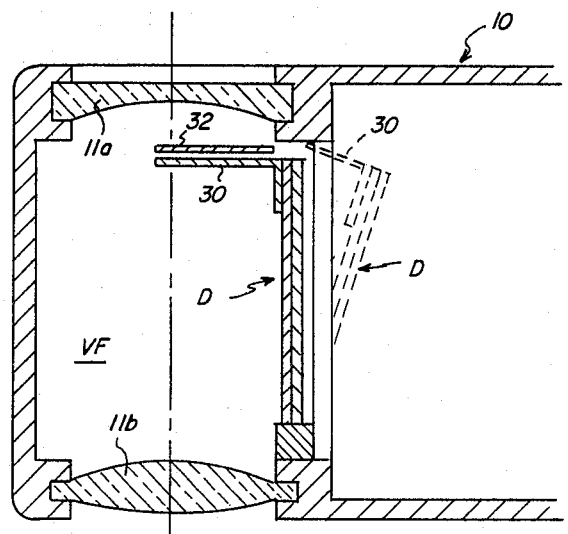
FIGS. 2a and 2b illustrate an alternative embodiment of the invention in which the flash-ready indicator of the invention indicates, respectively, a "not ready" and "ready" condition of the flash energizing circuitry.
Figure 2B:
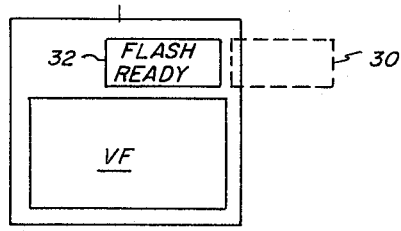

FIG. 2A illustrates an alternative embodiment of the invention in which the piezoelectric flexure device D is used to control the position of a planar member 30 which, depending on the shape of the flexure device D, selectively blocks a message-bearing optical plate 32. The flexure device is connected to the charge storing element of flash unit 12 in the manner described above except that the leads are connected so as to cause the device to flex away from the optical axis of the viewfinder when an electric field is applied. As shown in FIG. 2B, the flexure device causes the blocking member to move to the position shown in phantom lines when the charge on the charge storing element of the flash circuit reaches the level required to energize the flashlamp. As member 30 is in the position shown in phantom lines, a "flash-ready" message becomes clearly visible to the camera user.

While the flash-ready indicator of the invention has been described with particular reference to a camera having a built-in flash unit, it will be apparent to those skilled in the art that the invention has equal utility in those cameras which are adapted to receive an accessory-type flash unit. In such a case, the accessory flash unit, which incorporates the flashlamp and flash energizing circuit, would be operatively coupled to the piezoelectric flexure device by means of a conventional "jack" connector. Other variations and modifications can also be effected within the spirit and scope of the invention.

What is claimed is:

1. In a photographic camera comprising a housing, circuit means, including a charge storing element, for selectively energizing a flashlamp, such circuit means including means for charging such element to a predetermined level sufficient to ignite the flashlamp, and means for indicating to the camera user when the charge stored by the charge storing element has reached such predetermined level, the improvement wherein said indicating means comprises a piezoelectric flexure device, operatively coupled to said charge storing element, said device being adapted to change its shape in accordance with the level of charge stored by said charge storing element.

2. The invention as defined by claim 1 wherein said indicating means further comprises means for mounting said flexure device to the camera housing in a cantilever fashion.

3. The invention as defined by claim 1 wherein said piezoelectric flexure device comprises a uniaxially polarized plastic film.

4. The invention as defined by claim 3 wherein said plastic film is a film selected from the group consisting of polyvinylidene fluoride, polyvinylchloride, copolymers of polyvinylidene fluoride and polytetrafluoroethylene.

5. The invention as defined by claim 1 wherein the camera includes a viewfinder through which objects to be photographed can be viewed by the camera user, and said indicating means comprises means for mounting said piezoelectric flexure device in the viewfinder in a position to be observable by the camera user as the charge storing element accumulates charge.

6. The invention as defined by claim 1 wherein the camera includes a viewfinder through which objects to be photographed can be viewed by the camera user, and said indicating means comprises a message-bearing member arranged in the viewfinder, a message-blocking member, and means for operatively coupling the blocking member with the piezoelectric flexure device, whereby said flexure device controls the relative positions of said message-bearing member and said blocking member.

7. In a photographic camera of the type which is adapted to receive, as an accessory, a flash unit comprising a flashlamp and circuit means, including a charge storing element, for selectively energizing the flashlamp, such circuit means including means for charging the charge storing element to a predetermined level sufficient to ignite the flashlamp;

a flash-ready indicator for indicating to the camera user when the charge stored by the charge storing element has reached said predetermined level, said indicator comprising a piezoelectric flexure device, and means for operatively coupling said device to the charge storing element so that said device assumes a shape determined by the level of charge stored by the charge storing element.

8. The invention as defined by claim 7 wherein the camera includes a camera, and wherein said indicator comprises means for mounting the flexure device to the housing in a cantilever fashion.

9. The invention as defined by claim 7 wherein said piezoelectric flexure device comprises a uniaxially polarized plastic film.

10. The invention as defined by claim 9 wherein said plastic film is a film selected from the group consisting of polyvinylidene fluoride, polyvinylchloride, copolymers of polyvinylidene fluoride and polytetrafluoroethylene.

11. The invention as defined by claim 7 wherein the camera includes a viewfinder through which objects to be photographed can be viewed by the camera user, and said indicating means comprises means for mounting said piezoelectric flexure device in the viewfinder in a position to be observable by the camera user as the charge storing element accumulates charge.

12. The invention as defined by claim 7 wherein the camera includes a viewfinder through which objects to be photographed can be viewed by the camera user, and said indicating means comprises a message-bearing member arranged in the viewfinder, a message-blocking member, and means for operatively coupling the blocking member with the piezoelectric flexure device, whereby said flexure device controls the relative positions of said message-bearing member and said blocking member.

* * * * *